United States Patent
Russo et al.

(10) Patent No.: US 9,582,656 B2
(45) Date of Patent: Feb. 28, 2017

(54) SYSTEMS FOR VALIDATING HARDWARE DEVICES

(75) Inventors: Thomas Russo, Seattle, WA (US); David Abzarian, Kenmore, WA (US); Nidhi S. Sanghai, Newcastle, WA (US); Pak Kiu Chung, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 186 days.

(21) Appl. No.: 13/230,401

(22) Filed: Sep. 12, 2011

(65) Prior Publication Data

US 2013/0067236 A1 Mar. 14, 2013

(51) Int. Cl.
| | |
|---|---|
| G06F 21/44 | (2013.01) |
| G06F 21/81 | (2013.01) |
| G06F 21/00 | (2013.01) |
| G06F 21/72 | (2013.01) |
| G06F 21/73 | (2013.01) |
| G06F 21/50 | (2013.01) |
| G06F 21/57 | (2013.01) |

(52) U.S. Cl.
CPC .............. *G06F 21/44* (2013.01); *G06F 21/00* (2013.01); *G06F 21/50* (2013.01); *G06F 21/57* (2013.01); *G06F 21/72* (2013.01); *G06F 21/73* (2013.01); *G06F 21/81* (2013.01)

(58) Field of Classification Search
CPC .......... G06F 21/00; G06F 21/73; G06F 21/44; G06F 21/50; G06F 21/57; G06F 21/72; G06F 21/81
USPC ................................................. 713/176, 189
See application file for complete search history.

(56) References Cited

U.S. PATENT DOCUMENTS

| | | | | |
|---|---|---|---|---|
| 5,875,248 | A | * | 2/1999 | Lewis ........................... 713/168 |
| 6,990,504 | B2 | * | 1/2006 | Powell et al. |
| 8,074,888 | B2 | * | 12/2011 | Naccache ................ 235/472.02 |
| 2003/0084297 | A1 | * | 5/2003 | Spain et al. .................. 713/176 |

(Continued)

OTHER PUBLICATIONS

P. Iglio, "TrustedBox: a kernel-level integrity checker," Computer Security Applications Conference, 1999. (ACSAC '99) Proceedings. 15th Annual, Phoenix, AZ, 1999, pp. 189-198.*

(Continued)

*Primary Examiner* — Kari Schmidt
(74) *Attorney, Agent, or Firm* — Timothy J. Churna; Dan Choi; Micky Minhas

(57) ABSTRACT

A computing environment in which devices interoperate with a plurality of hardware components. Inconsistencies in user experience when operating devices that may use different components are avoided by generating a signature for the components. The signature may be computed as a function of a first key and one or more parameter values obtainable from the component. The signature and parameter values may be stored in the component's memory, and may be obtainable while the component is in operation as part of the computing device. The device may validate the component by performing at least one function based on the signature, the one or more parameter values obtainable from the component, and a second key, which may or may not be identical to the first key. The device may change its interaction with the component, depending on whether the component was successfully validated.

19 Claims, 10 Drawing Sheets

(56) References Cited

U.S. PATENT DOCUMENTS

| | | | |
|---|---|---|---|
| 2003/0196102 A1* | 10/2003 | McCarroll | G06F 21/51 713/194 |
| 2005/0108548 A1* | 5/2005 | Ohta | 713/182 |
| 2005/0220095 A1* | 10/2005 | Narayanan et al. | 370/389 |
| 2005/0222815 A1* | 10/2005 | Tolly | 702/185 |
| 2007/0038827 A1* | 2/2007 | Inooka | G06F 21/445 711/163 |
| 2008/0024268 A1* | 1/2008 | Wong et al. | 340/5.8 |
| 2008/0065893 A1* | 3/2008 | Dutta | H04L 9/321 713/176 |
| 2009/0229892 A1* | 9/2009 | Fisher | G06F 1/1626 178/18.03 |
| 2011/0093701 A1* | 4/2011 | Etchegoyen | 713/165 |
| 2011/0093703 A1* | 4/2011 | Etchegoyen | 713/168 |
| 2011/0295908 A1* | 12/2011 | To et al. | 707/803 |

OTHER PUBLICATIONS

Kocher, Paul, et al. "Security as a new dimension in embedded system design." Proceedings of the 41st annual Design Automation Conference. ACM, 2004, pp. 753-760.*

Chen, Liqun, et al. "A protocol for property-based attestation." Proceedings of the first ACM workshop on Scalable trusted computing. ACM, 2006, pp. 7-16.*

* cited by examiner

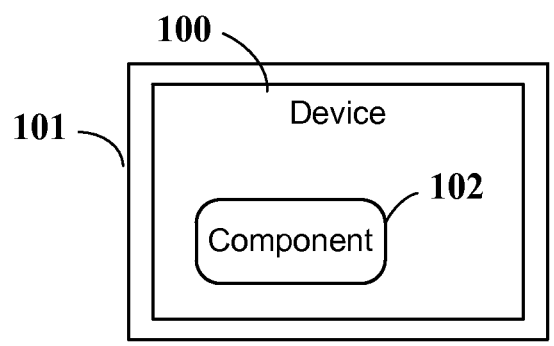
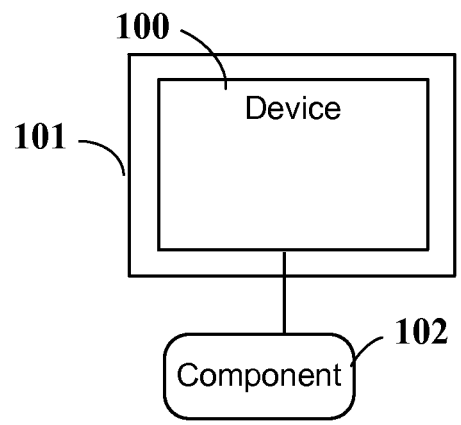
FIG. 1A
FIG. 1B
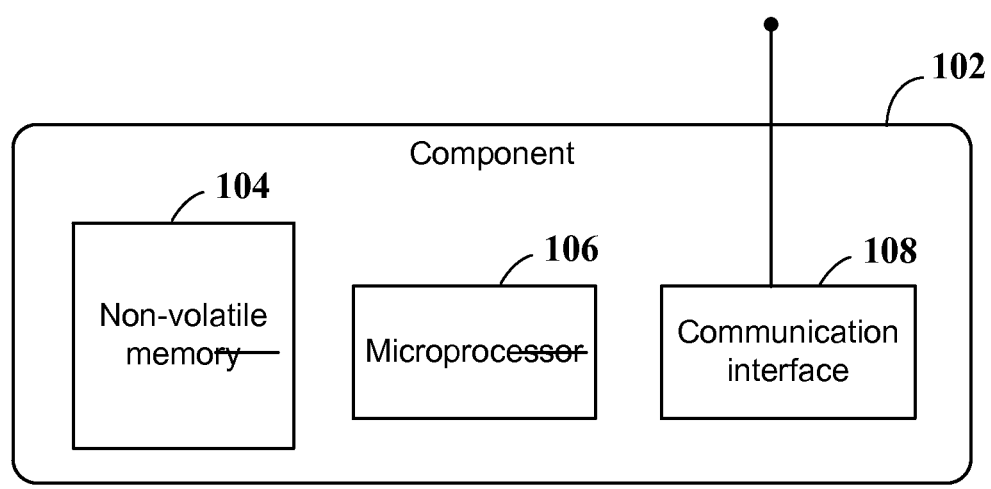
FIG. 1C

SYSTEMS FOR VALIDATING HARDWARE DEVICES

BACKGROUND

Computing systems may be arranged in a variety of possible configurations that utilize many different types of components. Such components can originate from any number of manufacturers, resulting in unpredictable quality and reliability of the components. This, in turn, can lead to inconsistent performance of the computing devices in which the components operate. In particular, hardware components can significantly impact user experience because users frequently interact with computing devices through hardware components. The quality and reliability of hardware components are therefore important foundations of ensuring a desired quality of user experience in operating computing devices.

For example, a user operating a touch screen device relies heavily on interactions with the touch screen interface. If a hardware component, such as the touch controller, is sluggish or unreliable, then the entire device becomes less usable. Furthermore, if the hardware component is integrated within the device, such as inside an enclosure surrounding the device, then the user may unknowingly identify other hardware or software components as the cause of the problem. In particular, a user may interpret poor performance of a computing device as reflective of the particular operating system used in the device, even if the underlying performance ultimately depends on hardware components.

To help avoid the problem of inconsistent user experience due to unreliable hardware components, it is known to establish standards of quality for components that may have originated from any number of possible entities, such as independent hardware vendors and original equipment manufacturers. Such standards of quality may help ensure that devices using such components maintain consistent user experience across different applications and usage environments. For example, an approval of quality may be given to components that successfully complete one or more tests, designed to determine whether the component satisfies certain criteria. Such approval may be granted, for example, by organizations that may have authority to approve devices for interoperating with operating systems in host computing devices.

A purchaser of a computing device may thus be safeguarded from components, which possibly may yield poor performance of the computing device, that have not received such approval. For example, in corporate enterprises, a technology administrator may use such approval as an indication of trust for hardware components, and may only provision the corporation with computers using components that are approved. Personal consumers may also use the approval to protect their computer devices from unreliable components or even hardware components that have been maliciously designed to gain unauthorized access to personal data or services.

SUMMARY

In computing environments in which devices interoperate with different hardware components, a signature is generated for a component. The signature may be computed as a function of a key and one or more parameter values obtainable from the component. These parameter values may represent, for example, any information associated with the component or the component's manufacturer, and may comprise a vendor identifier for the manufacturer and/or a product identifier for the component.

The signature, as well as parameter values, may be stored in a memory of the component, such as the component's firmware or other non-volatile memory. The component may have a communication interface adapted to respond to requests to provide the signature and parameter values from the component, which may be used by the host device's operating system to validate the component.

The host device operating system may attempt to validate the component's signature by performing at least one function on the signature, parameter values, and a key. The host device operating system may conditionally interact with the component based on the result of the validation attempt. For example, if the validation succeeds, then the host device operating system may perform one or more functions, such as allowing the component to access particular data or service on the host device. Otherwise, the host device operating system may limit, including by blocking entirely, the ability of the component to interoperate with the device.

In one aspect, the invention relates to a method of operating a computing system to generate a signature for a component adapted for use as part of a computing device. The signature may be generated by determining one or more parameter values obtainable from the component while in operation as part of the computing device. The signature may then be computed as a function of the parameter values and a key.

In another aspect, the invention relates to a component adapted for use as part of a computing device, the component comprising a processor and a non-volatile memory. The non-volatile memory may contain one or more parameter values and a signature representing a result of a cryptographic function of the one or more parameter values. Furthermore, the component may have an interface adapted to return, in response to at least one request, the signature and one or more parameter values.

In another aspect, the invention relates to a computing device comprising a component, a processor, and at least one computer storage medium comprising instructions that, when executed by the processor, implement an operating system for the computing device. The operating system may obtain a signature from within the component and validate the signature by obtaining one or more parameter values from the component and performing at least one function based on the parameters, the signature, and a key.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A is a schematic illustration of a configuration in which a computing device may interoperate with a hardware component that is integrated within the device;

FIG. 1B is a schematic illustration of an alternative configuration in which a computing device may interoperate with a hardware component that is external to an enclosure of the device;

FIG. 1C is a schematic illustration of one possible embodiment of a hardware component that is adapted to interoperate with a computing device;

DETAILED DESCRIPTION

Figure 1D:
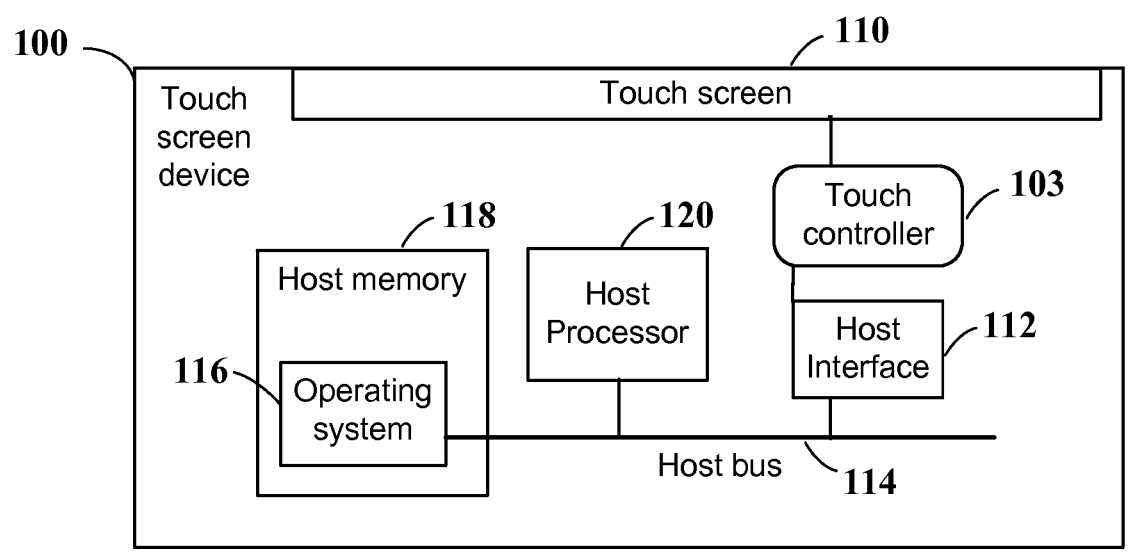
FIG. 1D is a schematic illustration of one possible embodiment in which a computing device, such as a touch screen computing device, may interoperate with a hardware component, such as a touch controller for a touch screen.

The inventors have recognized and appreciated that improved authentication procedures for validating hardware components may reduce the risk of a poor user experience for users operating computing devices that utilize such components. In some embodiments, a signature may be placed in a component, such that a computing device interoperating with the component can use the signature to determine proof of the component's origin and/or quality.

Though various forms of authentication protocols are known, those protocols are generally unusable when the memory or processing available on a component is limited. Because memory and processing is limited on components frequently used as part of a computing system, such as keyboards, mice, tablets, or touch controllers, known authentication procedures are not well suited for validating components of the type that may be used in widely distributed computers.

The inventors have recognized and appreciated that benefits could be achieved from incorporating into a computing device a system to validate low functionality components, as are used in computing devices that are widely distributed The inventors have also recognized and appreciated that such a system to validate components could perform authentication functions as a computer operates. The system deployed in this way could be of particular value in improving the experience of users of computing devices if it was capable of validating components, such as a touch controller interface or other components that have limited memory and processing power.

In some embodiments, an effective system suitable for use in connection with validating components of computers that are widely distributed may be implemented by performing cryptographic computations on a host device without requiring extensive processing on the hardware component that interoperates with the host device. In some embodiments, a validation procedure may a signature that may be efficiently stored on and retrieved from a component. For example, the signature may be stored as a string of bits, or a blob (Binary Large OBject). The signature may contain information that indicates that the component was generated by a trusted source that commits to issue such certificates only for components that meet established criteria. In addition, the signature may contain information that allows a host device, with which the component interoperates, to confirm that the signature was issued for the component that is interacting as part of the computer system.

Any suitable criteria may be used to determine whether a signature should be provided for a component. For example, it is known to provide certification logos or other indications of approval for hardware components that may be used in one or more computing devices. The purpose of this approval may be, for example, to ensure a desired level of quality and safety in the component. For example, a hardware component may be granted approval if the component satisfies one or more criteria. These criteria may include successfully completing a series of tests that measure performance of the component. Furthermore, in some embodiments, a computing device using the component may attempt to validate that the component has been approved for use. Those known criteria, or any other suitable criteria, may be used to determine whether to provide a signature for a component.

In some embodiments, there may be an end-to-end process for granting and validating signatures for hardware components that have met such criteria. For example, there may be multiple entities, or organizations, involved in this process: 1) the hardware component's manufacturer, 2) an organization with the power to grant approval for hardware components to interoperate with operating systems, and 3) an entity that provides components that control operation of a computing device to interact with the hardware component. The entity that has the power to grant approval may operate an encryption system that generates a signature for each hardware component that meets the criteria. That entity may provide a signature, if generated, to the manufacturer of the component to incorporate into each copy of the component manufactured. In addition, the entity may provide information to the entity providing control within the computing device to enable control components to validate hardware components as installed in the computing device. The control components may be structured to use that information and conditionally control operation of the computing device based on whether, in actual operation, detected hardware components interoperating with the computing device can be validated. The exact number and nature of the entities that participate in the process, however, is not essential to the invention. For example, the organization with the power to grant approval and the entity that provides components that control operation of a computing device may be the same entity. This entity, for example, may commercially distribute operating systems for computing devices.

Regardless of how or where components are approved, there may be a computing system that generates a signature for a component that has been approved. In some embodiments, the signature may be generated as a function of one or more parameter values obtainable from the component when in actual operation as part of a computer system. In this way, a host device, with which the component interoperates may have access to the same information, which it may use to validate the component. In some embodiments, the encrypting system may combine the parameters before encryption. This combination may be done, for example, using a one-way hash, a concatenation, or by any other suitable combination function. In some embodiments, the result of the combination may be a binary blob, or a string of bits.

In some embodiments, the signature may be generated using one or more parameter values and a key. The key may be known privately to the encrypting system, or it may be a key that is shared between the encrypting system and operating systems, or other components that control interaction with the hardware components that are validated, in host devices that will attempt to validate the hardware components. For example, the key may either be a private key in a public/private key pair, or it may be a shared secret key.

One or more of the parameter values may be chosen in such a way that they are likely to only be used by approved manufacturers. For example, the parameters may include a Vendor ID (VID), which may have been issued by an industry association or other entity that may enforce which manufacturers may place such parameters on their components. In some embodiments, such parameters, though used in connection with a signature that is generated cryptographically, are not themselves encrypted. Accordingly, if an unauthorized manufacture used a counterfeit vendor ID, it could be readily detected. This may provide an extra layer of security, in that even if a manufacturer were able to forge the key used by the encryption system, the manufacturer may be discouraged from creating a valid signature based on parameter values that it is restricted from using. Alternatively or additionally, the parameters may include information unique to the component to bear a signature, such as a Product ID (PID).

Regardless of the specific parameters used, once the encrypting system generates a signature for an approved component, the signature may be distributed to a manufacturer. In some embodiments, the signature may be distributed embedded within other information, the purpose of which may be to conceal the exact nature of the signature from manufacturers. The manufacturer may then place the signature, or the information containing the signature, in a location within a component's non-volatile memory. This memory may be, for example, firmware or FLASH memory, or any other suitable non-volatile storage area.

FIG. 1A and FIG. 1B illustrate simplified representations of two possible embodiments in which a device 100 may interoperate with a hardware component 102. The device 100 may be a personal computer (PC), tablet computer, smartphone, monitor, or in general any device that can store and process data. The component 102 may be any hardware component that may interoperate with device 100. The interoperation may involve requests and responses for data or services. Such requests and responses may be used for authentication functions, to convey information in normal operation of the component, or any other appropriate purpose.

FIG. 1A illustrates one possible embodiment of a configuration in which a hardware component 102 is integrated within an enclosure 101 of a device 100. The enclosure 101 may be composed of any suitable material, including, but not limited to, plastic, metal, or glass. Examples of such a configuration include, but are not limited to, integrated components, such as disc drives or touch controllers, interoperating with devices, such as personal computers, or touch-screen tablets.

Alternatively, FIG. 1B illustrates another possible embodiment in which a hardware component 102 interoperating with a device 100 is external to an enclosure 101 of device 100. Examples of such a configuration include, but are not limited to, peripheral components, such as keyboards, mice, or external touch controllers, connected to a computing device, such as a personal computer or a display monitor.

Regardless of the specific nature and interrelation of device 100 and component 102, in both FIG. 1A and FIG. 1B, the component 102 may communicate with the device 100 through a communication mechanism. The communication mechanism may use a wired or wireless connection, or any other suitable communication medium. As an example, the communication mechanism may be any suitable bus adapted for use for inter-component communication in a computer system. The communication mechanism may also involve a communication protocol, such as USB, Bluetooth, serial, such as serial ATA or I$^2$C, or any other suitable protocol that provides for communication between a hardware component and a device.

FIG. 1C illustrates one possible embodiment of a hardware component 102 that may be adapted to interoperate with a computing device. In some embodiments, the component 102 may comprise a non-volatile memory 104. The memory 104 may be located within firmware of the component 102, or alternatively, the memory 104 may be a FLASH memory chip or other suitable component. The exact nature and name of the non-volatile memory 104, however, is not critical to the invention, and in general memory 104 may be any storage area capable of storing data.

The hardware component 102 may also comprise a processor 106. The processor 106 may be a low-power processor or microcontroller, as the case may be in some hardware components such as keyboards, mice, or touch controllers. Alternatively, the processor 106 may be dedicated control circuitry or other suitable implementation. The exact nature of the processor 106, however, is not critical to the invention, and the processor 106 may be any processor capable of performing operations and computations on data. In some embodiments, the processor 106 may have the ability to store and retrieve data upon request from a computing device.

The hardware component 102 may also comprise a communication interface 108. The interface 108 may provide the ability to send and receive communication over a bus or any other suitable communication medium. For example, the interface may be adapted to return data in response to requests from a device. Furthermore, the interface 108 may use a communication protocol, such as USB, I$^2$C, or any other protocol that provides communication between a hardware component 102 and a device.

FIG. 1D illustrates one possible embodiment of a host device 100, which may be a touchscreen device, such as a touchscreen tablet or touchscreen monitor. The device 100 may inter-operate with a hardware component 103, which in this example may be a touch controller, that is integrated within the touch screen device 100. Alternatively, the touch controller 103 may be externally connected to the touch screen device 100, as the location of the controller 103 with respect to the device 100 is not critical to the invention.

In some embodiments, the touch controller 103 may receive information from a touch screen 110. The touch screen 110 may be resistive and/or capacitive, may comprise indium tin oxide (ITO) or any other suitable material, and may be single-touch or multi-touch. The exact nature of the touch screen 110, however, is not critical to the invention, and in general, the touch screen 110 may be any screen that is capable of detecting the presence and location of touch within a display area.

The touch controller 103 may receive information from the touch screen 110 and may perform one or more actions, including, but not limited to, interpreting and processing the user's touch input on the touch screen 110. Furthermore, in some embodiments, the controller 103 may communicate information to the host device 100 by interacting with a host interface 112. The host interface 112, for example, may use a communication protocol that is compatible with the component's interface 108 in FIG. 1C. The communication protocol may use a communication line or lines 114, which may be a collection of traces on a printed circuit board, a cable or any other suitable communication medium.

In some embodiments, the controller 103 may interact with the host device 100 through an operating system 116 of device 100. The operating system 116 may be implemented, for example, by a host processor 120 executing instructions stored on at least one computer storage medium, such as host memory 118. In some embodiments, the operating system may be implemented using techniques as are known in the art. In addition, the operating system may be configured to interact with some or all of the hardware components in the computing system to validate and conditionally perform functions based on the result s of that validation. For example, as part of validation, the operating system 116 may send requests to and receive responses from the controller 103 using the communication line 114 and interface 112.

Such requests and responses may involve, for example, an authentication procedure that may allow the host device 100 to validate that the component 103 has been approved for use with the operating system 116. In some embodiments, the authentication procedure may involve the operating system 116 requesting information from the controller 103 and then attempting to validate that information. For example, the information may comprise a signature and one or more parameters. In some embodiments, validation of the signature may be performed by the operating system 116 using a cryptographic function with a key that may be local to the host memory 118.

The signature for component 103 may have been granted by a certification authority or any other entity that has authority to grant approval for component to be used with operating systems, such as operating system 116, in devices, such as device 100. In some embodiments, the approval may be based upon the component satisfying one or more criteria, which may determine characteristics of the component. For example, if the component is a touch controller 103, then the approval of such a component may be based on the speed, consistency, and/or accuracy of the controller 103 in recognizing user inputs to the touch screen 110. Regardless of how the approval is granted, the approval may provide an indication that the component has been deemed suitable for use with an operating system of one or more devices.

In some embodiments, there may be an end-to-end process for granting and validating approvals for components to interoperate with an operating system of a host device. A portion of one possible embodiment of such an end-to-end process is illustrated in FIG. 2A and FIG. 2B, which combined illustrate two portions of such an end-to-end process involving a component manufacturer 200, an approval authority 202, and a device 100 that interoperates with a component 102.

The manufacturer 200 may be an independent hardware vendor or an original equipment manufacturer, or any entity that manufactures, distributes or otherwise provides hardware components that may be adapted to be used in, attached to or otherwise interoperate with computing devices. The approval authority 204 may be an entity with the power to grant approval for components to interoperate with operating systems in computing devices. The exact number and nature of the entities involved in process 200, however, is not essential to the invention.

Figure 2A:
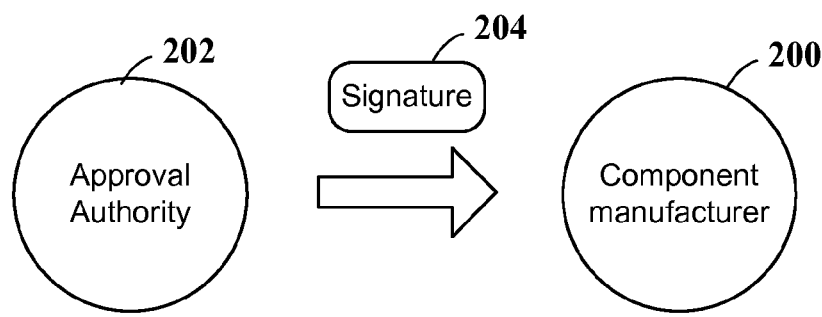
FIG. 2A is a simplified illustration of one possible embodiment of a process of granting approval to a component.

FIG. 2A illustrates one possible embodiment of an approval authority 202 granting approval to a component manufacturer 200. In some embodiments, such an approval may involve sending a signature 204 to the manufacturer 200. The signature 204 may then be used by the manufacturer as proof, or certification, that one or more components manufactured by the manufacturer 200 have been approved for use with one or more devices.

Figure 2B:
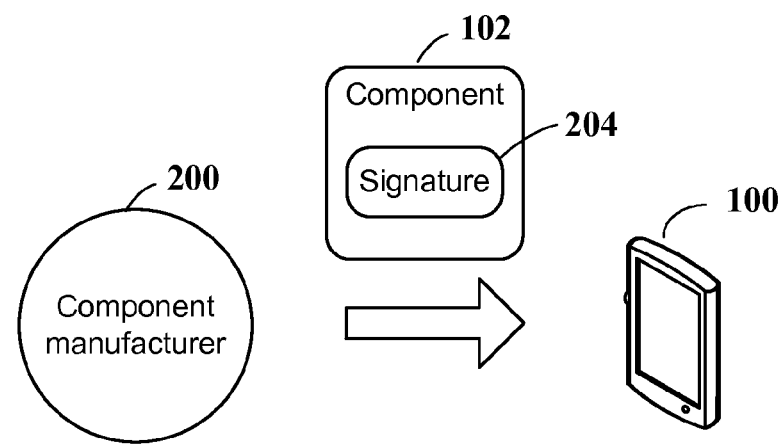
FIG. 2B is a simplified illustration of one possible embodiment of a process of distributing a signed component to interoperate with a device.

FIG. 2B illustrates one possible embodiment of a manufacturer 200 subsequently distributing a component 102 which has received approval. In some embodiments, the manufacturer 200 may install a signature 204 into the component 102, where the signature 204 may have been granted by an approving entity, such as approval authority 202 in FIG. 2A. When the component is installed in a device 100, the signature 204 may provide an indication to device 100 whether the component 102 has been approved for use in the device 100. In some embodiments, the device 100 may attempt to validate the signature 204 and based on the results of validation, may perform different sets of functions.

In some embodiments, the granting and validation of approval may involve an authentication procedure. For example, both the approval authority 202 and an operating system of device 100 may each use a local key to participate in an authentication procedure. A first key may be used by the approval authority 202 to generate a cryptographically secure signature 204 to be placed in the component 102. In embodiments in which the component may be validated by an operating system in a computing device, a second key may be distributed with every copy of an operating system that may be installed in devices, such as device 100, that may interoperate with component 102.

In some embodiments, the first and second keys may be a private/public key pair. In such a scenario, for example, the approval authority 202 may use a private key to generate a cryptographic signature 204, while the host device 100 may use a public key to decrypt the signature 204. Alternatively, in some embodiments, the two keys may be shared secret keys. In this scenario, both the approval authority 202 and the host device 100 may each use identical shared secret keys to encrypt and decrypt the signature 204, respectively. In this latter scenario, security measures may be taken on the host device 100 to obscure the key or otherwise preclude it from being improperly accessed.

Figure 3A:
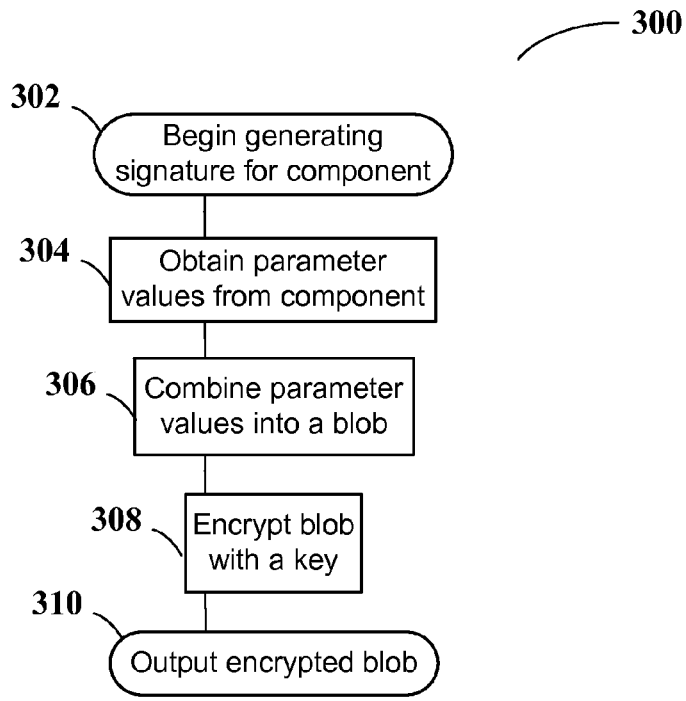
FIG. 3A is a flow chart of one possible embodiment of a method of generating a signature for a component.

FIG. 3A is a flow chart of one possible embodiment of a method 300 of generating a signature for an approved hardware component. The signature may be generated, for example, by an entity, such as approval authority 202 in FIG. 2A, and the method 300 may be performed in a server or other computing device of that entity. In general, however, method 300 may be performed by any computing system that generates signatures for components. In block 302, the a computing system may begin generating a signature for a component, which may be a result of the component being granted approval to interoperate with one or more devices. This approval may be granted, for example, based on a sample of a component being submitted for testing against specific criteria.

In block 304, the computing system may obtain one or more parameter values from the component. In some embodiments, this may be done by the computing system sending a request to the component through the component interface 108 in FIG. 1C and receiving one or more parameter values in response. In some embodiments, the parameter values may be publicly-readable, such that they may be obtained from the component while the component is in operation with a computing system or device. Components for installation in computing devices may use techniques as are known in the art to report information. For example, many devices may report, in response to a request, values of parameters such as vendor ID, product ID, firmware version or device type. Such techniques may be used at step 304. Though, any suitable techniques may be used.

In block 306, the parameter values may be combined. The combination may be done using any suitable means, for example, using a one-way hash function, a concatenation, or any other suitable means of combining one or more pieces of data. In some embodiments, the result of the combination may be a blob.

In block 308, the combined parameter values, which may be a blob, may then be encrypted. The encryption may be done using a key that may be local to the computing system implementing approval process 300 or stored and/or accessible from that computing device. In some embodiments, the key may be a private key in a public/private key pair, or alternatively, the key may be a shared secret key that is shared by the computing system implementing approval process 300 and other computing devices.

In block 310, the encrypted blob may then be output as a signature for a component. This signature may then be sent to a manufacturer, as in FIG. 2A, for use in one or more approved components.

Figure 3B:
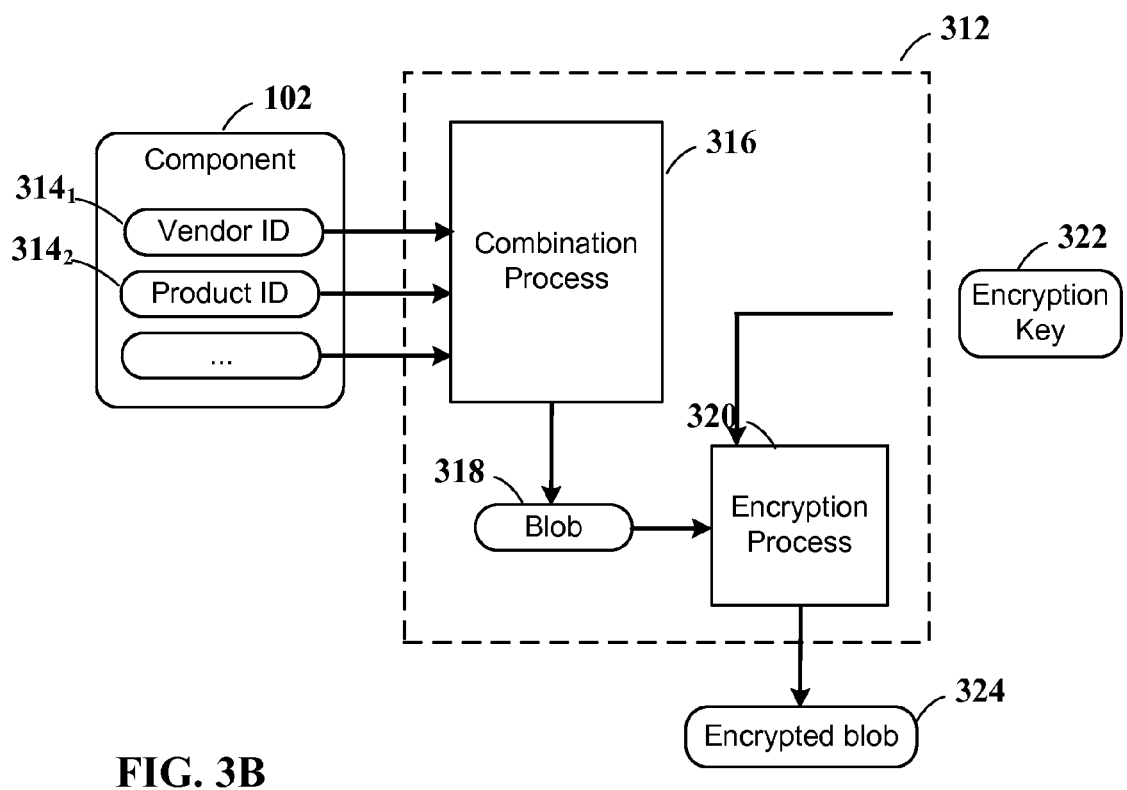
FIG. 3B is a sketch illustrating one possible embodiment of a method of generating a signature for a component.

FIG. 3B is a sketch illustrating one possible embodiment of generating a signature for a hardware component 102. When a hardware component 102 is granted approval, an encrypting module, such as standalone signing executable 312 executing, for example, on a computing device of a certifying authority, will obtain parameter values from component 102. These parameter values may include, for example, a Vendor ID (VID) $314_1$ and/or a Product ID (PID) $314_2$. These parameter values may be combined using combination process 316, which may involve any of the steps described in block 306 of FIG. 3A, into a binary blob 318. The blob may then be signed in an encryption process 320, which may involve any of the steps described in block 308 of FIG. 3A, using an encryption key 322 to produce an encrypted blob 324. The encrypted blob 324 may then be used as a signature 204 in FIG. 2A and FIG. 2B. The encryption key 322 may a private key of a private-public key pair, or may be a shared secret key.

The parameter values, such as VID $314_1$ and PID $314_2$, may be chosen in such a way as to make it difficult for malicious manufacturers to copy a signature from an authorized component and use it with an unauthorized component into which the same parameter values have also been copied. For example, in some embodiments, these parameters may have been issued to the component 102 by an entity, such as an industry organization or government, with authority to enforce the identity of components possessing such parameters. A malicious manufacturer attempting to use a signature may also reveal a VID $314_1$ and PID $314_2$ on the component, which may then be detected by the entity that issued the parameter values. In such a way, the manufacturer may be discouraged from generating a signature using those parameter values.

The parameters may be chosen in a customizable manner, according to different embodiments and scenarios. For example, the number of parameter values may be chosen depending on the trustworthiness of the component. In some embodiments, the signature for a component may be generated using more parameter values if the component manufacturer is deemed to be trustworthy. Alternatively, the signature may be generated using fewer parameter values for a manufacturer deemed less trusted. In embodiments in which the parameters are chosen in a customizable way, information about the customized parameters may be provided to or made available to the entity that produces the component that validates the signature at run time.

The result of the signing process in FIG. 3B, which may be an encrypted blob 324 used as a signature, may be sent to a component manufacturer, which may then place the signature in other components of the same type that it manufacturers. The location of the signature in the component may be a component property field reserved for this purpose, or in general any storage area in the component that can be accessed when the component interoperates with a computing device.

Figure 4A:
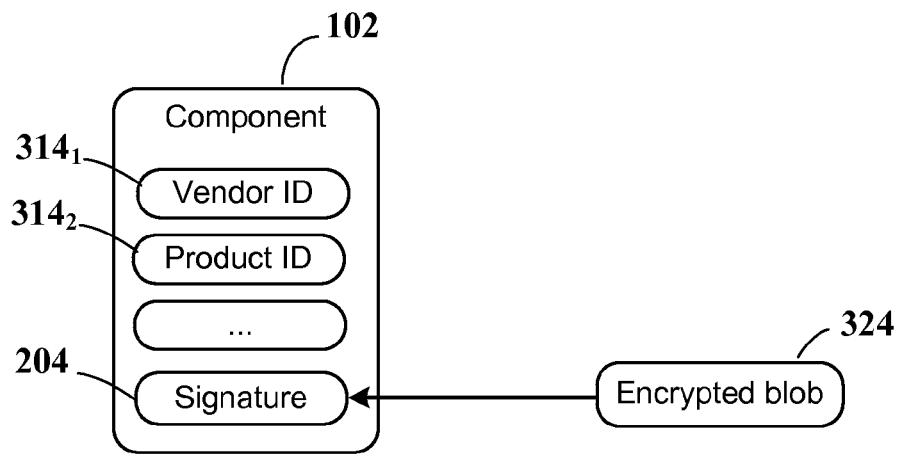
FIG. 4A is a sketch illustrating one possible embodiment of a signature being stored in a component.

FIG. 4A illustrates one possible embodiment of placing an encrypted blob 324 from FIG. 3B as a signature 204 into a component 102. In some embodiments, this may be done for one or more components that are similar to component 102. For example, components of a given model may share the same signature 204. The signature 204 may be placed in a well-known location in the component 102. Alternatively, the signature 204 may be placed in a location that is not specifically designated to hold a signature but that can be accessed when the component 102 is in operation, so as to conceal the nature of the signature 204 from malicious manufacturers.

The hardware component 102 may store and retrieve the signature 204 by using functions of existing protocols or in any other suitable way. In this way, a component 102 may participate in authentication functions in an easily-extensible manner. For example, if the component 102 uses the Human Interface Device (HID) protocol, then the signature 204 may be stored as a HID property maintained in a command register. In such a scenario, the component 102 may use existing HID protocol functions that allow information from the memory of the component to retrieve the signature 204 upon request from a computing device.

Furthermore, the signature 204 may be stored and retrieved as an embedded part of other information in such a way that neither the hardware component 102 nor the manufacturer may access or identify the signature 204 directly. In such a way, malicious manufacturers may be deterred from forging signatures in unauthorized components. Such authentication procedures may allow for more efficient and secure validation of a wide variety of different hardware components for use in host computing devices.

Figure 4B:
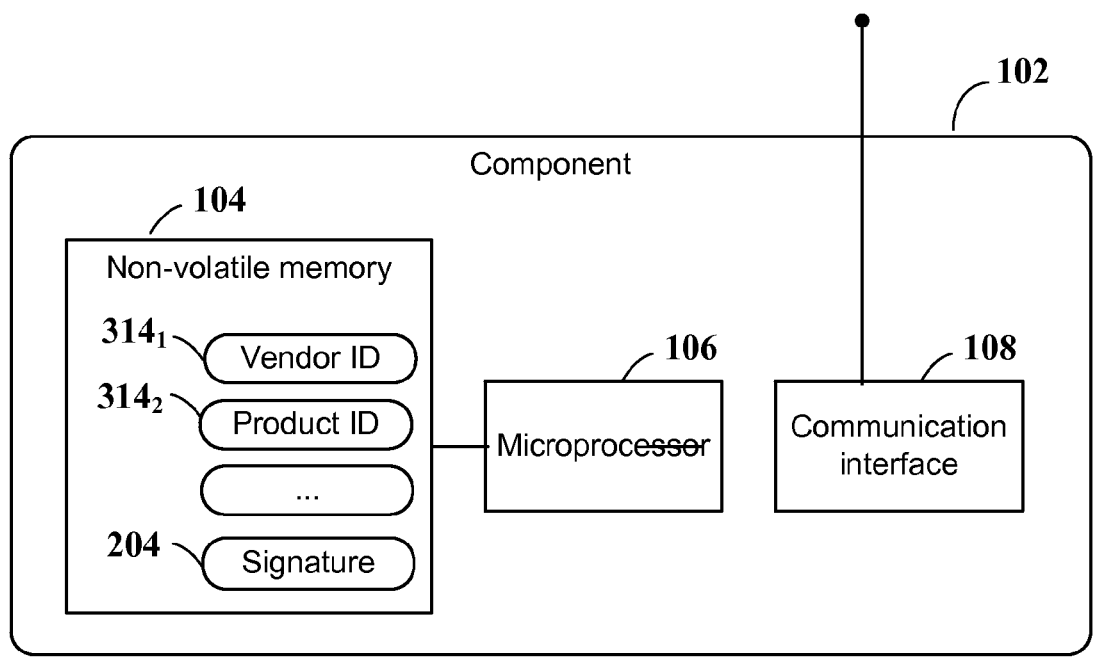
FIG. 4B is a schematic illustration of one possible embodiment of a component that may be adapted to interoperate with a device.

FIG. 4B illustrates one possible embodiment of storing parameter values and a signature in a component 102. As illustrated in FIG. 1C, the component 102 may have nonvolatile memory 104, a processor 106, and a communication interface 108. In some embodiments, the parameter values, such as VID $314_1$ and PID $314_2$ and a signature 204 may be stored in the component memory 104 in known parameter locations. Alternatively, the locations of the parameters and signature 204 may be unknown to the component, for example, if they are embedded as part of other information stored in component memory 104.

Figure 5A:
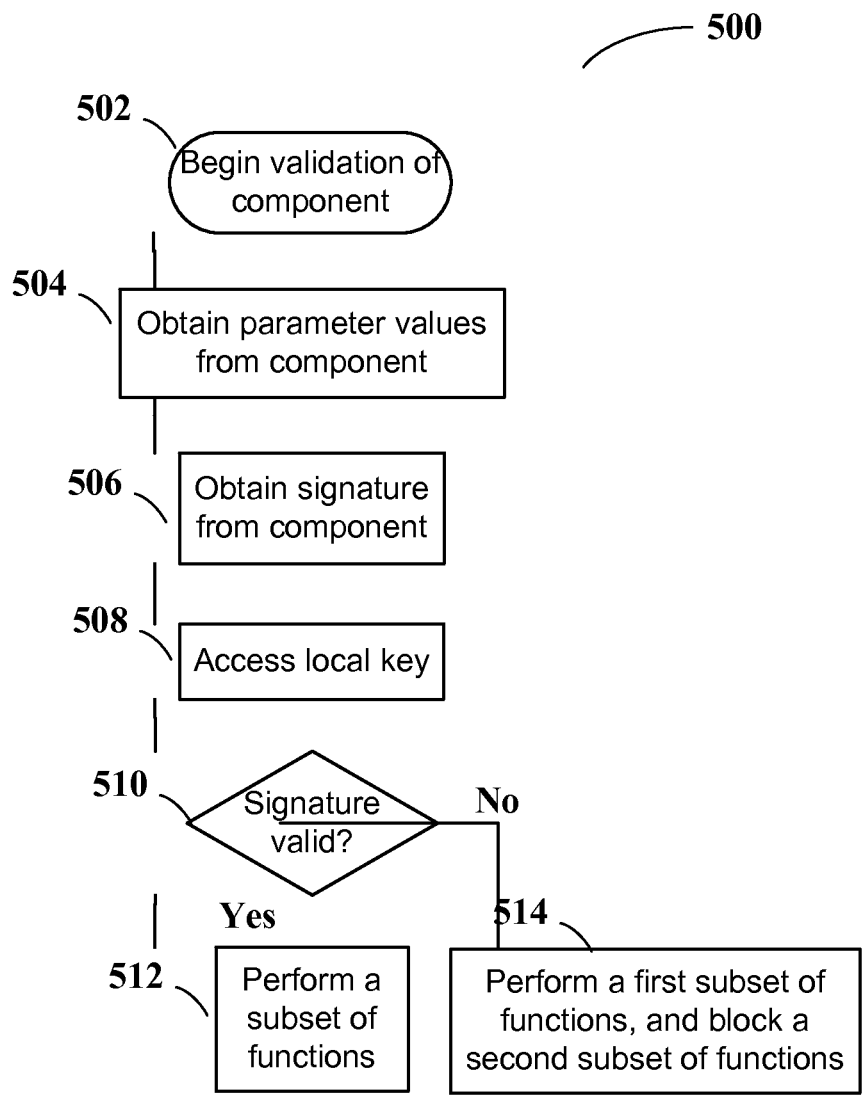
FIG. 5A is a flow chart of one possible embodiment of a method of validating a signature on a component.

FIG. 5A is a flow chart describing one possible embodiment of a method 500 of validating a signature on a hardware component. The method 500 may be used, for example, in a validation process, such as the embodiment illustrated in FIG. 2B. In some embodiments, method 500 may be performed by an operating system, such as operating system 116 in host device 100 illustrated in FIG. 1D, to validate a component such as controller 103. Any suitable component of the operating system may perform the validation. Though, in the illustrated embodiment, the validation is performed within the kernel of the operating system in a portion that manages interactions with hardware components.

In some embodiments, validation method 500 may be performed when a component first connects to a device, which may occur when the device is first powered on or when the operating system first detects the component, or when the component is first plugged into the device or turned on. Alternatively, validation method 500 may be performed at a later time, for example, when the component requests data or services from the device. The timing and frequency of the validation method 500 may be determined in any appropriate manner, for example, based upon a level of security desired by the operating system for the host device.

Regardless of when the validation process 500 is performed and how often it is repeated, in block 502 of FIG. 5A, an operating system of a host device begins the process of validating a component by first obtaining one or more parameter values from the component in block 504 and a signature from the component in block 506. The parameter values and signature may be obtained in any number of ways. For example, the host device may send requests to the component, and the component may respond with the requested information.

In some embodiments, requests, such as those in blocks 504 and 506, and corresponding responses, between a host device and a component may be available as extensible functions of existing communication protocols. For example, if a host device and a component use the HID protocol, then the host device and a component of the device may use existing HID operations to perform the requests and responses in blocks 504 and 506, or in general, to perform any other communication.

In some embodiments, the host device's request for a signature in block 506 may be a direct query to a specific location in the component's memory or may be made as a request for a specific type of information, which an interface on the component may retrieve and return. For example, the signature may be stored on the component as a HID property or a validation code, or may be stored as any other designated parameter value in the component's memory. Regardless of the nature of the query, the operating system performing the validation may be programmed to make such a query. Alternatively, in some embodiments, the signature may be stored as a part of other information in the component's memory, and block 506 may involve the host device requesting this other information, which may contain the signature in a location unknown to the component's manufacturer. The purpose of such an indirect query for a signature may be, for example, to avoid revealing the location and nature of the signature, and thus deter malicious manufacturers from abusing the signature in unauthorized components.

Regardless of how the signature and parameters are obtained in blocks 504 and 506, respectively, the host device's operating system may attempt to validate the signature. In block 508, the validation may involve the device operating system accessing a key. This key may be either identical to or different from the encryption key 322 in FIG. 3B that was used to generate the signature. In general, the key may be any mechanism which the host device may use to validate the signature. The keys may be different, for example if a non-symmetrical key pair, such a public/private key pair, is used to avoid placing the encryption key in every copy of the operating system.

Regardless of the exact nature of the key accessed in block 508, in block 510, the host device may use the key to attempt validating the component's signature. In some embodiments, the host device may attempt to validate the signature using the key and one or more parameter values obtained in block 504. Alternatively, the host device may use any suitable validation procedure to determine whether the signature was indeed generated in an authorized manner.

Processing within the device may be conditioned based on the results of the validation. In the example, illustrated, if the validation in decision block 510 is successful, then the device's operating system may perform a certain subset of functions in block 512. In some embodiments, for example, the host operating system may allow the component to access certain data and/or services on the host device. In some embodiments, if the validation in decision block 510 was unsuccessful, then the host device may perform a first subset of functions, while blocking a second subset of functions. For example, the first subset of functions may be a set of functions that the component is allowed to perform in the host device. The second subset of functions may be a set of functions that the component, without proper authorization, may not be allowed to perform.

For example, in some embodiments, if the component is a touch controller operating in a device that uses a touch screen, then a validated touch controller may be allowed to perform multi-touch operations. Such an authorized controller may have been deemed capable of detecting multiple simultaneous touch points on the touch screen. In such a scenario, the host operating system may perform functions related to multi-touch user inputs.

Alternatively, if the signature cannot be validated in decision block 510, then a touch screen device's operating system may perform functions related to single-touch inputs, while blocking functions related to multi-touch inputs. Such a scenario may occur, for example, if the controller has been deemed too slow or unreliable to meet the demands of accurately detecting multiple simultaneous touch points on a device's touch screen. The controller may be allowed to detect single touch points on the touch screen, and may be forbidden from accessing multi-touch detection functionality. In this way, a user of a computing device may readily recognize that the lower quality components are installed in the computing device.

It should be appreciated, however, that the specific functions that are performed or blocked by the operating system in blocks 512 and 514 are not critical to the invention. In general, the host operating system may take any suitable differential actions based on the validation result in decision block 510. These differential actions may relate to the interoperation of the device with a hardware component adapted for use in the device.

Furthermore, the validation in decision block 510 may involve any suitable authentication procedure by the host operating system. In some embodiments, the host authentication procedure may be related to an end-to-end process for granting and validation of approval of a component for use in one or more devices. For example, the key accessed in block 508 may be either the same as or different from the encryption key 322 used in the process of generating a signature, a possible embodiment of which was illustrated in FIG. 3B.

In some embodiments, the host key accessed in block 508 and used to validate the signature in block 510 may be different than an encryption key 322 used to generate the signature in FIG. 3B. For example, this may occur if the two keys are parts of a private/public key pair. In such a scenario, the signature may be generated using a private key 322 in FIG. 3B, while the host device may access a public key in block 508 to validate the signature in block 510 in FIG. 5A.

Alternatively, in some embodiments, the host key accessed in block 508 may be identical to an encryption key 322 used to generate the signature in FIG. 3B. For example, this may occur if the two keys are shared secret keys. In such a scenario, the same key may be used to both generate the signature as well as to validate the signature.

It should be appreciated, however, that the specific nature of using keys to generate and validate the signature is not critical to the invention. The keys may be used in any manner to allow for a cryptographically secure authentication procedure involving a host device validating a component that was approved by an approval authority. Furthermore, one or both keys may be unknown to the manufacturer of a component that stores the signature.

Figure 5B:
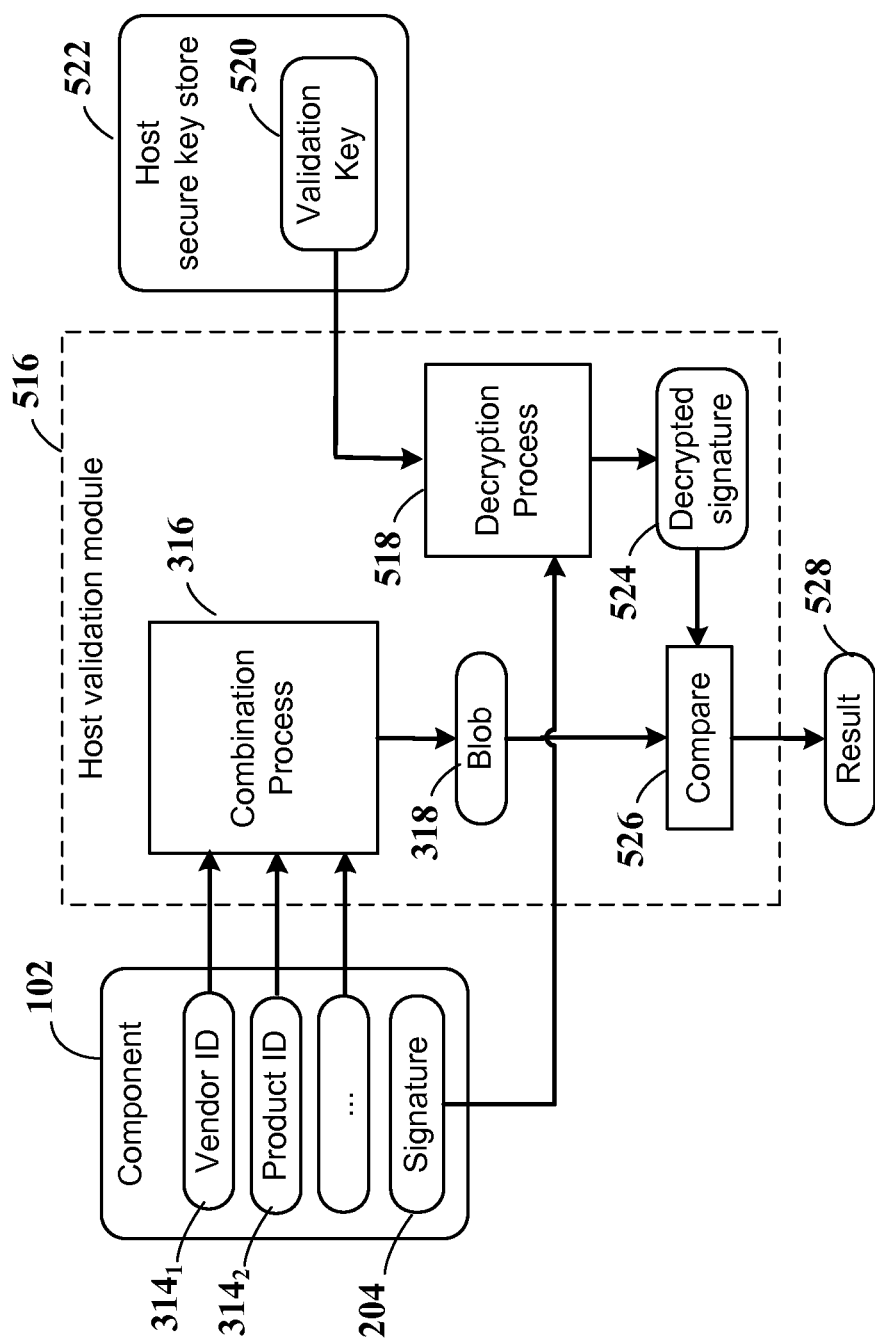
FIG. 5B is a sketch illustrating one possible embodiment of a method of validating a signature for a component using a public key of a private-public key pair.
Figure 5C:
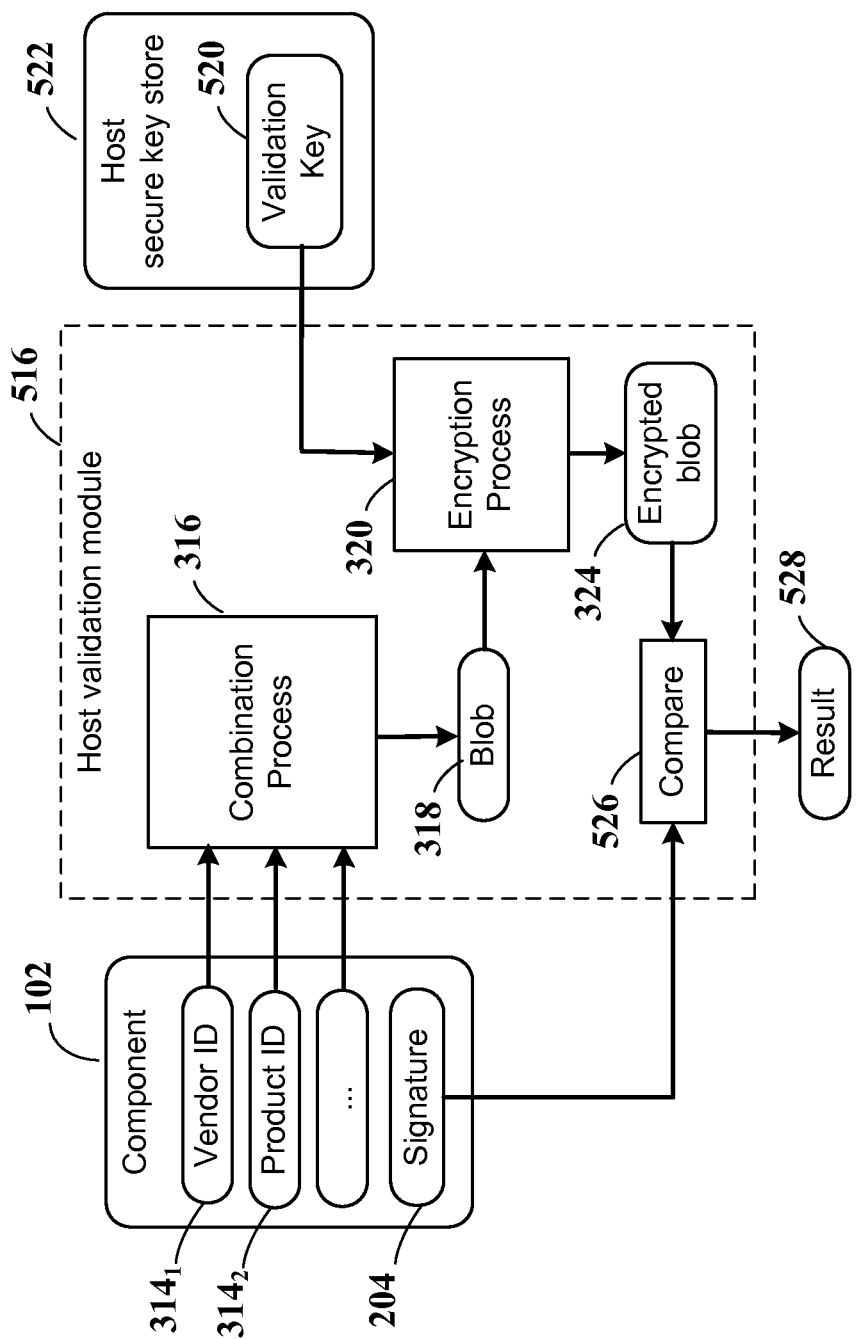
FIG. 5C is a sketch illustrating another possible embodiment of a method of validating a signature for a component using a shared secret key.

FIG. 5B and FIG. 5C illustrate possible embodiments of validating procedures which may be used by an operating system of a host device to validate a component. FIG. 5B illustrates an embodiment in which a host may use a public key of a private/public key pair. FIG. 5C illustrates an embodiment in which a host may use a shared secret key. However, it should be appreciated that these are exemplary embodiments and in no way limiting. In general, a host operating system may use any suitable authentication procedure in decision block 510 to determine the validity of a signature in a component.

FIG. 5B illustrates an embodiment in which a host operating system may attempt to validate a signature by using a key that is different from a key used to generate the signature. In some embodiments, the host operating system may use a validation module 516, which may be an executable program located in the host memory, to perform the validation function. The host operating system may obtain from the component 102 several pieces of information, including but not limited to, parameter values, such as a Vendor ID (VID) 314$_1$ and/or a Product ID (PID) 314$_2$ and a signature 204.

The operating system may then combine the parameter values in a combination process 316 to generate a blob 318. The combination process 316 and resulting blob 318 may be identical to those used by the signature-generating process in FIG. 3B. The host operating system may then decrypt the signature 204 in a decryption process 518. This decryption process may use a validation key 520, which may be obtained from a secure key store 522 in the host memory, and which may be different than the encryption key 322 illustrated in FIG. 3B.

The host operating system thus obtains a decrypted signature 524, which it compares to the blob 318 in a comparison module 526. The result of the comparison may then be output as result 528. This result 528 may then be used by the host operating system to determine an appropriate set of functions to perform for the component 102.

FIG. 5B illustrates an embodiment in which a host operating system may attempt to validate a signature by using a key that is identical to a key used to generate the signature. In some embodiments, the host operating system may use a validation module 516, which may be an executable program located in the host memory, to perform the validation function. The host operating system may obtain from the component 102 several pieces of information, including but not limited to, parameter values, such as a Vendor ID (VID) 314$_1$ and/or a Product ID (PID) 314$_2$, and a signature 204.

The operating system may then combine the parameter values in a combination process 316 to generate a blob 318, and encrypt the blob in an encryption process 320 to generate an encrypted blob 324. The encryption process 320 may use a validation key 520, which may be obtained from a secure key store 522 in the host memory, and which may be identical to the encryption key 322 illustrated in FIG. 3B. Furthermore, the combination process 316, blob 318, encryption process 320, and encrypted blob 324 may all be identical to those used by the signature-generation process in FIG. 3B. In comparison module 526, the host operating system may then compare the encrypted blob 324 with the signature 204 obtained from the component 102. The result of the comparison may then be output as result 528. This result 528 may then be used by the host operating system to determine an appropriate set of functions to perform for the component 102.

In some embodiments, the validation key 520 in FIG. 5B and FIG. 5C may be distributed as a part of an operating system that may be installed in one or more host devices. Furthermore, in some embodiments, the validation key 520 may be known only to operating systems in which the key 520 resides. In such a way, one or more operating systems may be able to validate any component that is adapted for use in devices that use the operating systems.

Figure 5D:
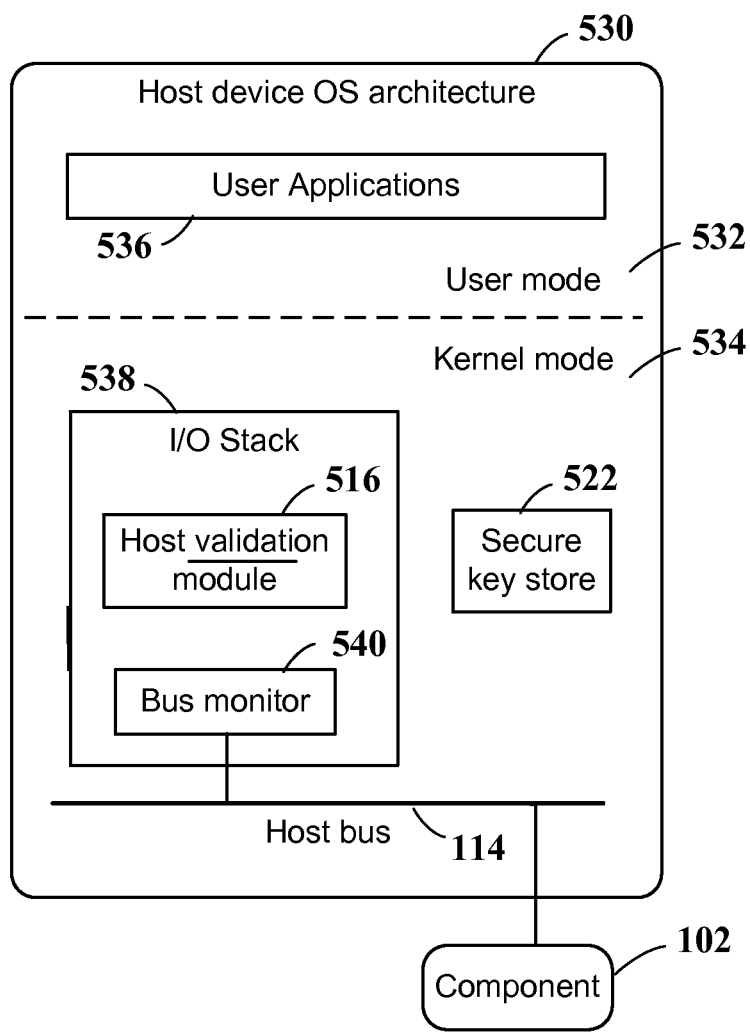
FIG. 5D is a simplified sketch of one possible embodiment of an operating system architecture implemented by a device validating a component.

FIG. 5D illustrates one possible embodiment of a host device's operating system architecture 530, which may be configured to validate a hardware component. The operating system architecture 530 may involve a user mode 532, representing a mode of operation in which a first set of data and/or services may be accessed while a second set of data and/or services may not be accessed. The operating system architecture may also involve a kernel mode 534, representing a mode of operation in which at least the first and second sets of data and/or services may be accessed.

In some embodiments, the host validation module 516 may reside in the kernel mode 534, such that programs residing in user mode 532, such as user applications 536, may not have access to the host validation module 516. Furthermore, in some embodiments, the host validation module 516 may reside in an I/O stack 538, or any suitable segment of memory that relates to interoperating with a hardware component 102.

A component 102 may attempt to interoperate with a host device, for example, by using a bus 114 and a suitable communication protocol to communicate using the bus. In some embodiments, a bus monitor 540 may detect the presence of the component 102 on the bus 114. This detection may be performed in any suitable way. For example, a protocol called Plug and Play (PnP) is used in some computers to detect connected devices. Such a protocol, or any other suitable protocol may be used.

Regardless of the specific protocol used, upon detecting the component 102, there may be an initialization phase. This initialization phase may involve a number of possible actions, for example, the bus monitor 540 may provide a notification to the host device's operating system that a component has been connected to the host device.

In some embodiments, upon detecting the presence of the component 102, the bus monitor may alert the validation module 516, which may attempt to validate the component 102 at that time. For example, the validation module 516 may perform method 500 illustrated in FIG. 5A, or any other suitable process to validate a signature in component 102.

Alternatively, or in addition, to validating the component 102 during an initialization phase, the validation module 516 may attempt to validate the component 102 at any later suitable time. Such a determination may depend on a desired level of security. In some embodiments, the host device may attempt to validate component 102 whenever the component 102 requests data and/or services from the device. This may happen, for example, if the component 102 is a plug-and-play component that is frequently connected and disconnected from the host device.

In some embodiments, the host device may validate the component 102 during certain events, such as power-down and power-up. In general, the timing and frequency of validation may depend on numerous factors, including but not limited to, the desired level of security in the host device and the speed of the host bus 114. For example, more secure devices may choose to perform more frequent validations of c component 102. Furthermore, if the communication bus 114 between the host device and component uses a protocol such as I$^2$C, which may have slower communication speeds than other protocols, then the host device may choose to validate component 102 less frequently.

It should be appreciated, however, that the validation of component 102 may be done at any suitable kernel-mode layer, and is not limited to the configuration illustrated in FIG. 5D. For example, validation of a component 102 may be done in a device driver, a HID class driver, a kernel module process, or any other suitable kernel-mode layer that can restrict the interoperation of the component 102 with user-mode layer applications 536.

In some embodiments, validation of component 102 may be done in kernel mode 534 in such a way as to prevent user-mode applications 536 from accessing the validation process. In such a way, a user application 536 may be deterred from bypassing or altering the validation function of the component 102. By performing the validation of component 102 in a kernel-mode layer, the operating system may determine which component 102 is allowed to access which user-mode application 536. If a component 102 is unable to be validated, then the host validation module 516, or any appropriate module validating the component 102, may not allow data and/or services to access user-mode applications 536.

Figure 6:
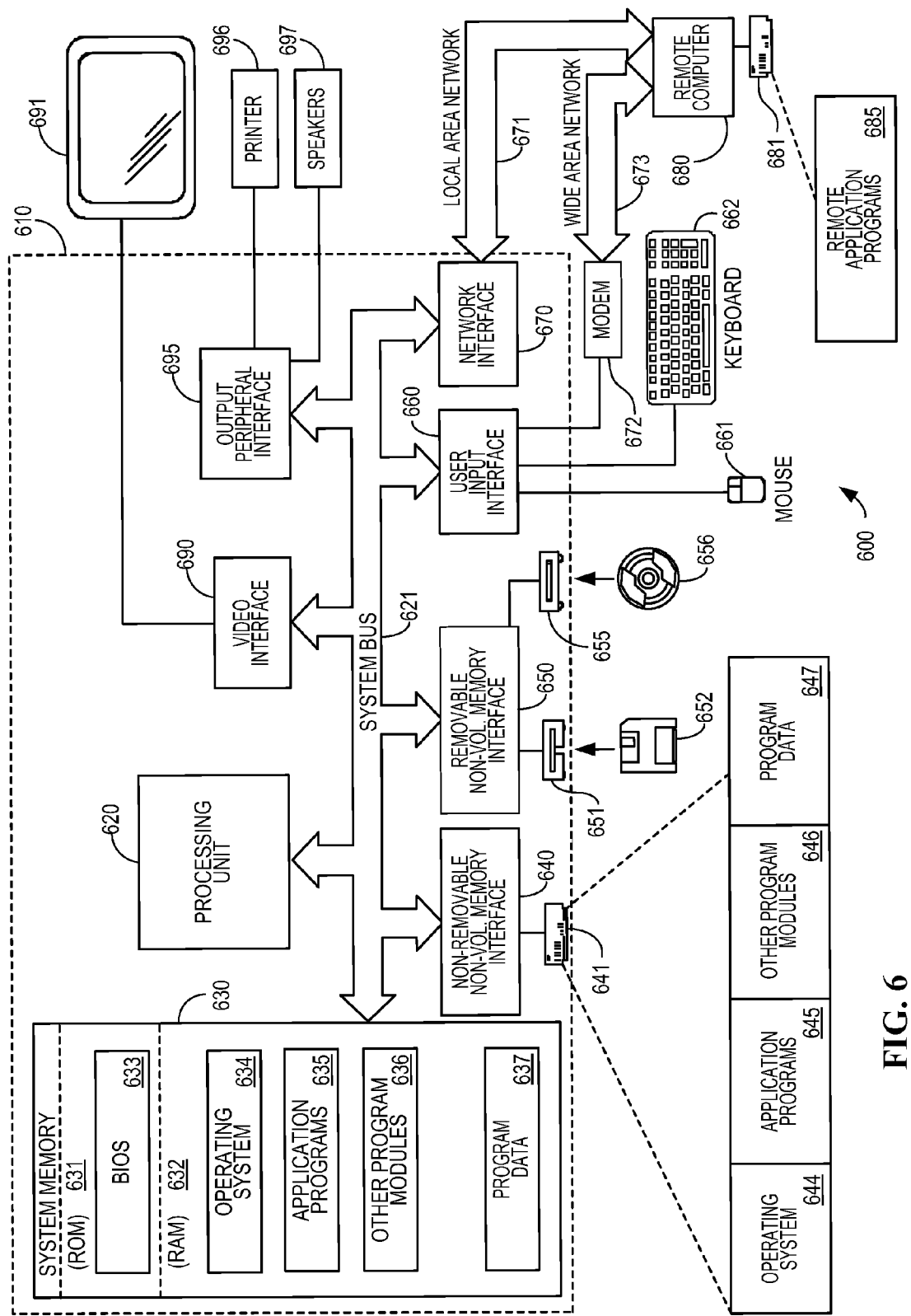
FIG. 6 is a schematic illustration of a representative computing device on which embodiments of the invention may operate.

FIG. 6 illustrates an example of a suitable computing system environment 600 on which the invention may be implemented. This computing system may be representative of a computing system used by an entity that issues signatures for components. It may also be representative of a computing device acting as a host for a component. However, it should be appreciated that the computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing system comprising a host computing device and a hardware component, the method comprising:
    obtaining one or more parameter values and a signature from the hardware component while the hardware component is in operation as part of the host computing device, the signature generated using a first key provided by an approval authority granting approval of the hardware component; and
    determining whether the signature is invalid, using at least one processor, by performing at least one cryptographic function based on the signature, the one or more parameter values, and a second key, the second key provided by an operating system of the computing system; and
    in response to the signature being determined to be invalid, allowing the hardware component to perform a first subset of functions of the hardware component but not allowing a second subset of functions of the hardware component, wherein the second subset of functions of the hardware component is blocked and the second subset of functions being available only for hardware components that provide a valid signature.

2. The method of claim 1, wherein performing the at least one cryptographic function based on the signature, the one or more parameter values, and the second key comprises:
    combining a first parameter value of the one or more parameter values and a second parameter value of the one or more parameter values to generate a blob;
    encrypting the blob using the second key to generate an encrypted blob; and
    comparing the signature to the encrypted blob.

3. The method of claim 1, wherein:
the one or more parameter values comprise a vendor identifier for a vendor of the hardware component and a product identifier for the hardware component.

4. The method of claim 3, wherein:
the hardware component is a touch controller for a touch screen of the computing device, the first subset of functions includes single-touch detection functionality, and the second set of functions includes multi-touch detection functionality.

5. The method of claim 1, wherein:
the first key is a private key of a public key/private key pair.

6. The method of claim 1, wherein:
a number of parameter values is chosen depending on a trustworthiness of the hardware component.

7. The method of claim 1, wherein the hardware component is validated after the hardware component requests at least one selected from the group consisting of data and services from the computing device.

8. The method of claim 1, wherein the first key is provided by the approval authority based on the hardware component satisfying one or more criteria, the criteria including at least one selected from the group consisting of speed of the hardware component, consistency of the hardware component, and accuracy of the hardware component.

9. A component configured for use as part of a computing device, the component comprising:
a processor;
a non-volatile memory;
a plurality of parameter values stored in the non-volatile memory;
a signature for the component stored in the non-volatile memory, the signature representing a result of a cryptographic function of a combination of the plurality of parameter values and a first key being granted by a certification authority based on the hardware component satisfying one or more performance criteria; and
an interface configured to return, in responses to at least one request, the signature and the plurality of parameter values; wherein the signature is used to validate the component by performing a cryptographic function using the signature and a second key provided by an operating system of the computing device, wherein:
when the signature is not validated, the component is allowed to perform a first subset of a plurality of functions that is allowable for validated components while the component is prevented from performing a second subset of the plurality of functions, wherein the second subset of the plurality of functions is blocked and is allowable only for validated components.

10. The component of claim 9, wherein:
the component is a touch controller for a touch screen of the computing device.

11. The component of claim 9, wherein:
the interface interfaces with a bus operating according to a Universal Serial Bus (USB) protocol.

12. The component of claim 9, wherein:
the plurality of parameter values comprise a vendor identifier for a vendor of the component and a product identifier for the component.

13. A computing device, comprising:
a hardware processor;
at least one computer storage medium comprising instructions, that when executed by the hardware processor, implement an operating system for the computing device that:
via a host interface, obtains a signature and one or more parameter values from a component in communication with the host interface, the signature stored on the component and generated using a first key provided by an approval authority;
via a validation module, determines whether the signature is valid by:
combining the one or more parameter values to generate a blob;
performing at least one cryptographic function based on the signature, the blob, and a second key, the second key being distributed with the operating system; and
via the operating system, allows the component to perform a first subset of one or more functions but not a second subset of one or more functions when the signature is determined to be invalid, the second subset of one or more functions, wherein the second subset of functions is blocked for the component and the second subset of functions being performed for components that provide a valid signature.

14. The computing device of claim 13, wherein performing the at least one cryptographic function based on the signature, the blob, and the second key comprises:
decrypting the signature using the second key; and
performing a comparison of the blob and information obtained from the decrypted signature.

15. The computing device of claim 13, wherein performing the at least one cryptographic function based on the signature, the blob, and the second key comprises:
computing an encrypted blob as a function of the blob and the second key; and
performing a comparison of the signature and the encrypted blob.

16. The computing device of claim 13, wherein:
the component is a touch controller for a touch screen of the computing device.

17. The computing device of claim 13, wherein:
the computing device has an enclosure; and
the component is external to the enclosure.

18. The computing device of claim 13, wherein:
the computing device further comprises a bus coupling the hardware processor to an interface of the component, the bus operating according to the Universal Serial Bus (USB) protocol; and
the operating system obtains the signature and the one or more parameter values in response to commands sent over the bus.

19. The computing device of claim 13, wherein:
the validation module resides in an input stack of the operating system.

* * * * *